United States Patent [19]

Shafranovsky et al.

[11] 4,202,846
[45] May 13, 1980

[54] ROTOR FILM APPARATUS FOR PROCESSES WITH PARTICIPATION OF LIQUID AND GAS

[76] Inventors: Alexandr V. Shafranovsky, Balashikha, Molodezhnaya ulitsa, 4, kv. 7, Moskovskaya; Viktor M. Olevsky, Leningradsky prospekt, 75ᵃ, kv. 91, Moscow; Vladimir K. Chubukov, Komsomolsky prospekt, 41, kv. 97, Moscow; Jury A. Baskov, shosse Entuziastov, 156, kv. 20, Moscow; Konstantin V. Dmitriev, Sovetsky prospekt 87 kv. 29, Kemerovo, all of U.S.S.R.

[21] Appl. No.: 948,991

[22] Filed: Oct. 4, 1978

[51] Int. Cl.² .................................................. B01F 3/04
[52] U.S. Cl. .................................. 261/142; 159/6 R; 202/236; 261/89; 261/90; 261/114 R; 261/153
[58] Field of Search .................. 261/25, 84, 88–90, 261/112, 142, 24, 81, 82, 114 R, 152, 153, 156; 159/6 R, 11 A; 202/236; 196/128; 203/89

[56] References Cited

U.S. PATENT DOCUMENTS

| | | | |
|---|---|---|---|
| 797,661 | 8/1905 | Cline | 261/89 X |
| 1,776,644 | 9/1930 | Vreeland | 261/89 |
| 2,218,342 | 10/1940 | Pegram | 261/89 |
| 2,313,546 | 3/1943 | Hickman | 261/90 X |
| 2,480,215 | 8/1949 | Bowden et al. | 261/89 |
| 2,601,519 | 6/1952 | Hardy et al. | 261/90 X |
| 2,793,710 | 5/1957 | Robinson | 261/89 X |
| 2,793,847 | 5/1957 | Steele | 261/89 |
| 2,944,801 | 7/1960 | Katz et al. | 261/24 |
| 3,369,800 | 2/1968 | Takamatsu et al. | 261/88 |
| 4,038,353 | 7/1977 | Shafranovsky et al. | 261/89 |

FOREIGN PATENT DOCUMENTS

| | | | |
|---|---|---|---|
| 967192 | 8/1964 | United Kingdom | 261/89 |
| 203621 | 12/1967 | U.S.S.R. | 261/89 |

*Primary Examiner*—Richard L. Chiesa
*Attorney, Agent, or Firm*—Haseltine, Lake & Waters

[57] ABSTRACT

A rotor film apparatus for processes with participation of liquid and gas having a casing, at least one refluxing stage arranged rotatably in said casing, and an appliance for delivering liquid to the refluxing stage. The refluxing stage is formed by at least one trough curved into a spiral which uncoils from the axis of the refluxing stage. The hollow of the trough is located at the concave side of the spiral. As the portions of the trough depart gradually from the axis of the refluxing stage, they are displaced in one direction parallel to the axis so that the refluxing stage as a whole is shaped like a bowl.

28 Claims, 14 Drawing Figures

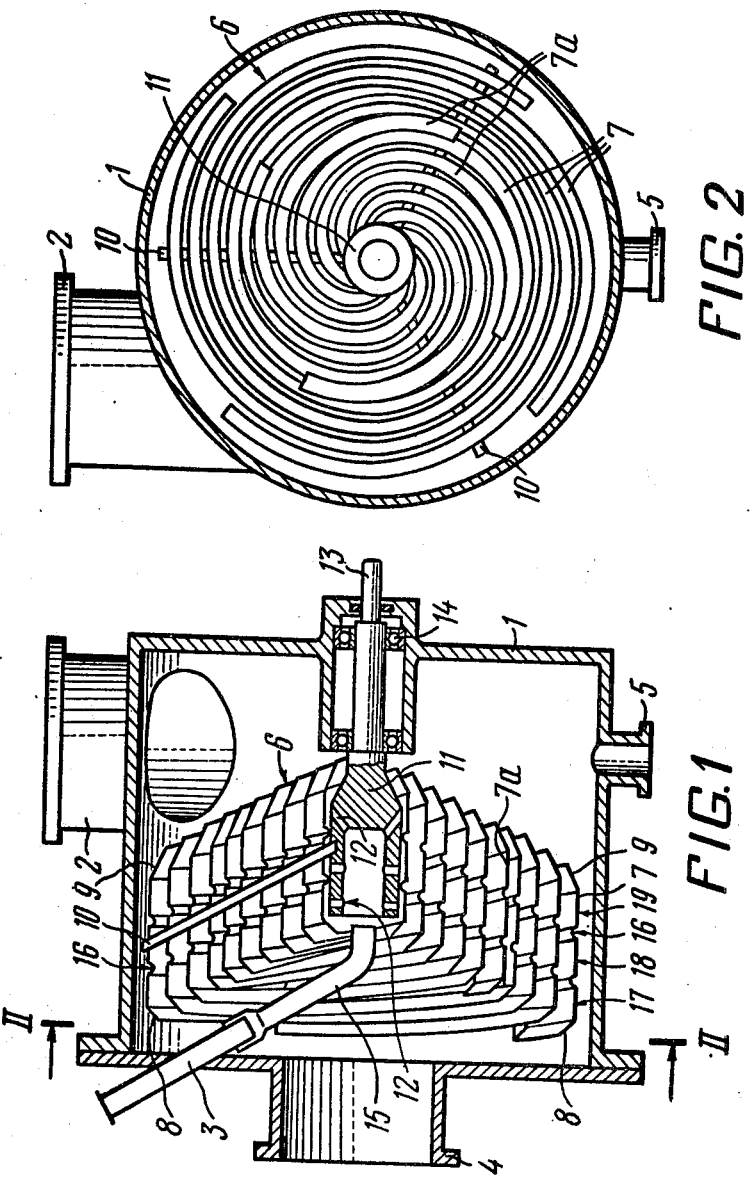

ROTOR FILM APPARATUS FOR PROCESSES WITH PARTICIPATION OF LIQUID AND GAS

The present invention relates to equipment for mass- and heat-exchange processes and more particularly it relates to a rotor film apparatus for processes with participation of liquid and gas, e.g. rectification, absorption, wet purification of dust-laden gases, and for vaporization of liquids in a film, i.e., distillation. The most preferable application of the invention is distillation and rectification of substances sensitive to elevated temperatures, e.g. lactams, fatty acids, polyatomic alcohols, ethanolamines, high-boiling ethers, various oils, food and pharmaceutical products.

Known in the previous art is a rotor film apparatus for processes with participation of liquid and gas comprising a casing which accommodates a number of rotatable refluxing stages. Each refluxing stage is formed by a trough curved into a spiral uncoiling from the axis of the refluxing stage. The gaps between the loops of the spiral allow for the passage of gas. The hollow of the refluxing stage trough is located at the concave side of the spiral. The troughs of each stage lie in one and the same plane being clamped between horizontal radial bars which are rigidly connected with a central mounting sleeve. The refluxing stages are mounted one under another on the vertical shaft of the apparatus. Secured around the refluxing stages are circular pockets to receive the liquid thrown from said stages. The upper edge of the circular pocket secured around the refluxing stage is located lower than the upper edge of the initial portion of the trough of the same stage. The space between the refluxing stages accommodates appliances delivering liquid to each refluxing stage. These appliances are made in the form of horizontal radial trays secured to the casing. The peripheral ends of said trays communicate with the overlying circular pockets. The appliances delivering liquid to the refluxing stages in the known apparatus are adapted to transfer liquid from the overlying circular pocket to the underlying stage. Thus, they simultaneously ensure the flow of liquid from one stage onto another.

The apparatus is also provided with pipe connections for admitting gas (vapour) and discharging the end products, i.e. gas and liquid.

When the known apparatus functions in the capacity of a rectifying tower, the liquid flows through radial trays onto the central part of the rotating refluxing stages. Being acted upon by the centrifugal forces, the liquid flows into the hollows of the spiral troughs. The liquid then flows in the form of a continuous film along the trough hollow on a spiral trajectory from the centre to the periphery of the refluxing stage. From the periphery of the rotating refluxing stage the liquid is thrown on the internal surface of the apparatus casing in the form of drops and streams. Under the effect of the force of gravity the liquid falls from the casing walls into the circular pocket which envelops the the refluxing stage. Then it flows from the pocket through the underlying tray onto the next underlying refluxing stage. The liquid thrown from the downmost refluxing stage is discharged from the apparatus.

The vapour enters the apparatus from underneath and passes through the gaps between the loops of the spirals of the refluxing stages. On the way, the vapour comes in contact with the liquid in the hollows of the troughs which form the spiral. After contacting the liquid in the uppermost refluxing stage the vapour is discharged out of the apparatus.

However, the known rotor film apparatus has a number of inherent disadvantages which impair the efficiency of mass- and heat-exchange processes with participation of liquid and gas.

One of the disadvantages lies in partial slippage of the liquid past the refluxing stage. At the point where the liquid falls on the refluxing stage it is partially deflected from said stage which is accompanied by splashing of a certain amount of liquid. The splashed drops are suspended in the moving flow of gas and are thrown by the centrifugal forces onto the internal walls of the apparatus casing. This amount of liquid does not return into the given refluxing stage. This factor reduces the motive force of mass- and heat exchange and the wetted surface of the refluxing stage. As a result, the total efficiency of mass- and heat exchange in the apparatus is decreased. This disadvantage becomes particularly conspicuous at high velocities of gas, at high flow rates of liquid, and at high rotating speeds of the refluxing stage.

Another disadvantage of the known rotor film apparatus lies in the impossibility of liquid recirculation on the refluxing stage. The impossibility for the liquid thrown from a refluxing stage to return to the same stage becomes obvious if we consider the design of the known apparatus. The liquid is kept from returning to the same stage by the force of gravity.

Recirculation of liquid on the refluxing stage could also ensure complete wetting of the working surface of said stage when the total amount of liquid fed into the apparatus is very small. For example, the amount of reflux per unit of the apparatus cross section during rectification in vacuo under a residual pressure of 1–3 mm of mercury is usually very small. Besides, in certain processes, e.g. during wet purification of gases, the amount of reflux is purposefully limited in order to cut down the expenses for its reclaiming.

Still another disadvantage of the known rotor film apparatus lies in the insufficiently developed heat-exchanging surface. The heat required for heating and, in particular, vaporizing the liquid in the film can be transferred to the latter only through the walls of the apparatus casing on which the liquid is thrown from the rotating refluxing stage. Thus, the working surface of the apparatus in the process of heat exchange is confined to a narrow circular strip enveloping the refluxing stage. This reduces the amount of heat transferred in a unit of the working volume of the apparatus to the substances taking part in the process, thus impairing the efficiency of heat exchange in the apparatus.

One more disadvantage of the known rotor film apparatus consists in difficulties involved in its assembly and dismantling and in poor reliability of its operation. The appliances intended to deliver liquid onto the refluxing stages have the form of radial trays connected with the casing and installed in the space between the stages. Before removing the shaft with the refluxing stages from the apparatus it is necessary first to take out all the radial trays whose number is frequently very large. Besides, owing to thermal stresses, vibrations and other reasons, the appliances for delivering liquid to the refluxing stages, i.e. radial trays, may get displaced towards the refluxing stages in the assembled operating apparatus. If so, the radial trays will brush against the rotating refluxing stages which may ultimately lead to a breakdown of the entire apparatus.

A further disadvantage of the known rotor film apparatus consists in an incomplete utilization of the inside volume of the apparatus because of spaces between the refluxing stages. These spaces take no part in the process of mass- and heat exchange, being used only to accommodate the appliances delivering liquid to each refluxing stage, i.e. for auxiliary operations only. As a result, this decreases the total efficiency of mass- and heat exchange in the apparatus.

A still further disadvantage of the known rotor film apparatus lies in absence of turbulent agitation, i.e. mixing of the liquid flowing through the trough hollows. This impairs the mass- and heat transfer in the film of the refluxing liquid.

An object of the invention is to provide a rotor film apparatus for processes with participation of liquid and gas wherein the liquid is prevented from slipping partly past the refluxing stage.

Another object of the invention is to provide a rotor film apparatus wherein the liquid is recirculated on the refluxing stage.

Still another object of the invention is to provide a rotor film apparatus with an extensively developed surface of heat exchange.

A further object of the invention is to provide a reliable rotor film apparatus which would be easy to assemble and dismantle.

A still further object of the invention is to provide a rotor film apparatus with a more completely utilized inside volume.

Additionally, an object of the invention is to provide a rotor film apparatus wherein the liquid flowing through the hollows of the troughs is subjected to turbulent agitation, i.e. mixing.

These objects are achieved by providing a rotor film apparatus for processes with participation of liquid and gas comprising a casing and at least one refluxing stage mounted in the casing with a provision for rotating around its own axis and formed by at least one trough curved into a spiral which uncoils from the axis of the refluxing stage and has a gap between its loops for the passage of gas, the hollow of the trough being located at the concave side of the spiral, and comprising an appliance for delivering the liquid to the refluxing stage wherein, according to the invention, the portions of the trough departing gradually farther from the axis of the refluxing stage are displaced in one direction parallel to said axis so that the refluxing stage as a whole is shaped like a bowl.

In this rotor film apparatus the liquid does not partially slip past the refluxing stage under the effect of the centrifugal or gravity forces irrespective of the position of the axis of rotation of the refluxing stage. The splashed drops of liquid created at the point where they fall on the refluxing stage and are entrained by the gas flow are acted upon by centrifugal and gravity forces and are thrown over a certain trajectory onto the walls of the apparatus casing. However, due to the bowl-like shape of the refluxing stage these splashes inevitably in contact with the refluxing stage and are trapped in the hollows of its troughs.

In any case the splashed liquid remains inside the "bowl" of the refluxing stage without getting immediately on the walls of the apparatus casing.

It is preferable that the troughs of the refluxing stage should have longitudinal partitions which divide said trough into a number of parallel channels. This construction of the troughs will prevent the inertia forces from accumulating the liquid at one edge of the trough, namely, at the edge located on the external surface of the "bowl" formed by the refluxing stage as a whole. The irregular distribution of the liquid across the width of each of a number of channels does not lead to irregular distribution of the liquid across the width of the entire trough.

It is also preferable that the refluxing stage of the apparatus should consist of several troughs of different length ending at different distances from the refluxing stage axis, the troughs of different length being arranged around the refluxing stage axis in a periodically recurring sequence. This is conducive to better retention of the liquid on the bowl-shaped refluxing stage. The worst conditions for retaining the liquid on the refluxing stage are observed in the central part of the refluxing stage where the centrifugal forces are weakest. At this point of the refluxing stage the centrifugal forces are insufficient for holding the liquid in the trough at high rates of liquid flow. Under the effect of inertia forces originated by the displacement of the trough portions along the rotation axis of the refluxing stage the liquid accumulates at the edge of the trough located on the external surface of the refluxing stage "bowl" and can overflow a side edge. An increase in the number of troughs, i.e. the number of spiral starts in the central part of the refluxing stage decreases the amount of the liquid flowing through each trough. This makes up for the insufficiently strong centrifugal forces which keep the liquid in the troughs of the central part of the refluxing stage.

It is preferable that the refluxing stage axis should be set vertically so that the portions of the refluxing stage trough would be displaced upward as they depart farther from the refluxing stage axis. Such an orientation of the refluxing stage makes for better trapping of the splashing liquid created at the point where the liquid falls on the refluxing stage because in this case the force of gravity is directed at the bottom of the refluxing stage "bowl" and helps in deflecting the trajectory of the splashes towards the stage troughs.

It is also preferable that the trough of the refluxing stage be inclined so that its upper side edge is located farther from the vertical axis of the refluxing stage than its lower side edge.

Such a construction of the troughs opposes the pressing of the liquid film by the inertia and gravity forces against the lower edge of the trough and assists in a more uniform distribution of the film throughout the width of the trough hollow, thus increasing the contacting surface between the gas and the liquid. As a result, this improves the efficiency of mass- and heat exchange in the apparatus.

It is also preferable that the inner side wall of the apparatus casing should be provided with a circular pocket arranged around the refluxing stage and which is intended to receive the liquid thrown from said stage and that the upper edge of said pocket should be arranged higher than the upper side edge at the beginning of the trough of the same refluxing stage. Due to the bowl-like shape of the refluxing stage, the liquid moving along the troughs from the centre to the periphery of the refluxing stage rises somewhat. As a result, said liquid accumulates potential energy within the zone of action of the force of gravity. This design of the pocket allows the newly acquired potential energy of the liquid to be used for auxiliary purposes, e.g. for further movement of the liquid in a preset direction under the effect of the force of gravity. It is universally known that the higher the initial level of the liquid, the stronger the force which moves said liquid in the preset direction. The potential energy of the liquid can be used to move the liquid to other points of the apparatus or even outside the given apparatus, e.g. into another series-connected apparatus. Besides, the maximum possible increase in the height of the upper edge of the circular pocket with the unchanged position of the pocket bottom is conducive to the better accumulating ability of said pocket. This reduces considerably the risk of liquid overflowing the upper edge of the pocket thereby increasing the throughput of the latter. In the known apparatus the upper edge of the pocket cannot be arranged above the upper edge of the beginning of the stage trough without detriment to the apparatus efficiency because of the flat shape of the refluxing stage.

It is also preferable that the refluxing stage should be provided with a central distributing sleeve which is open underneath and that an inclined recirculating pipe should be arranged under the refluxing stage, the upper edge of the inclined recirculating pipe communicating with the pocket which receives the liquid thrown down from the same refluxing stage and the lower end of said pipe being inserted from underneath into the central distributing sleeve of the refluxing stage. Such a construction of the apparatus will ensure recirculation of liquid on the refluxing stage realized according to the present invention. In this construction the liquid flows through the recirculating pipe from the circular pocket enveloping the refluxing stage into the lower part of said stage due to the potential energy of said liquid accumulated during its flow through the troughs of the bowl-shaped refluxing stage.

It is also preferable that the troughs of the refluxing stage should be made of a conducting material and that one inducting wire of a heating inductor should be placed opposite at least one side face of the refluxing stage, said wire being electrically insulated from the refluxing stage and the apparatus casing. In this case the troughs will be heated by the eddy currents induced in the troughs by the quickly-alternating electromagnetic field. Such a design of the apparatus allows the vaporization of the liquid film to be carried out directly on the refluxing stage troughs which, taken together, form an extensively developed heat-exchange surface.

Location of the inducting wire in close proximity to the refluxing stage troughs in the known rotor film apparatus will not produce eddy currents in the troughs because of the flat shape of the refluxing stage. In this apparatus the working surfaces of the troughs would be directed parallel to the lines of force of the alternating magnetic flux. Such relative arrangement of the troughs and magnetic lines of force is highly disadvantageous for the creation of eddy currents in the troughs. The bowl-like shape of the refluxing stage results in that various portions of the troughs are subjected to a more efficient action of the alternating magnetic flux and, consequently, intensifies the heating of the troughs at the given power rating of the heating inductor. As a result, the efficiency of heat exchange in the apparatus increases.

It is also desirable that the inclination of the various portions of the refluxing stage troughs in the rotor film apparatus should be selected so that the trough bottom would contact an imaginary surface of revolution whose geometrical axis coincides with the rotation axis of the refluxing stage. Such a construction of the apparatus improves still further the accessibility of all the portions of the trough to the magnetic fluxes of the heating inductor, thus increasing the heat transfer in the refluxing stage.

It is preferable that a shield of a nonconducting material be installed between the inducting wire of the heating inductor and the refluxing stage. This will protect the inducting wire from the effect of splashes and vapours of the heating liquid.

It is also preferable that the inducting wire of the heating inductor be located outside the apparatus casing and the casing proper be made from a nonconducting material for functioning as a shield.

Such a design of the apparatus will allow the inducting wire of the heating inductor to be completely withdrawn from the working space of the apparatus thereby protecting it fully against the effects of the processes carried out in the apparatus. An additional advantage of the rotor film apparatus according to the invention in the given concrete version lies in that the bowl-like shape of the refluxing stage makes it possible to also provide the nonconducting shield in the form of a bowl. This simultaneously ensures a minimum clearance between the refluxing stage and the inducting wire and the requisite strength of the casing made of a nonconducting shield. It is known that the strength and stiffness of the apparatus functioning under vacuum have to meet more exacting demands than in the case of operation at atmospheric pressure. And it is likewise known that vaporization of heat-sensitive products is carried out more efficiently under vacuum.

It is preferable that the rotor film apparatus should comprise several refluxing stages secured one above another on a common shaft so that the upper edge of the underlying refluxing stage is arranged higher than the lower edge of the overlying refluxing stage. In such an arrangement of the refluxing stages the liquid falling in some way from the overlying refluxing stage will not be thrown by centrifugal forces to the walls of the apparatus but will fall on the underlying refluxing stage and continue to take part in the process of contacting the gas, though on another refluxing stage.

It is also preferable that the space between the refluxing stages should accommodate at least one overflow pipe connected with the refluxing stage and putting the peripheral end of the trough of the overlying refluxing stage in communication with the central part of the underlying refluxing stage. Such a design of the apparatus will considerably facilitate its assembly and dismantling and increase its operational reliability. In this case the appliances delivering liquid to the refluxing stage simultaneously ensure the transfer of said liquid from the upper refluxing stage to the lower one. The liquid-delivering appliances rotate together with the shaft and the refluxing stages and are rigidly connected therewith. This also facilitates the assembly and dismantling of the apparatus because the appliances delivering liquid to the refluxing stages can be removed from the apparatus jointly with said stages and the shaft as an integral unit, i.e. the rotor of the apparatus.

It is also desirable that there should be radially-directed baffle plates installed in the spaces between the refluxing stages.

The provision of baffle plates increases additionally the surface of contact between liquid and gas due to the spray mist formed in the space between the refluxing stages when the liquid encounters the baffle plates before entering the refluxing stage.

It is also desirable that the appliance for delivering liquid to the refluxing stage should comprise a pipe connection secured to the side wall of the apparatus, the discharge end of said pipe connection being located at such a distance from the axis of the refluxing stage which is larger than the minimum distance from the axis of said stage to its periphery. Such a construction of the apparatus will facilitate its disassembly and dismantling and ensure high reliability in operation.

It is no less desirable that the appliance for delivering the liquid to the refluxing stage should be made in the form of a pipe connection located above said stage and provided with a number of discharge holes set at different distances from the stage axis. This construction of the apparatus ensures turbulent agitation of the liquid film moving along the hollow in the trough of the rotating stage by the streams of the liquid flowing from the discharge holes of a fixed pipe connection located above the refluxing stage.

Now the invention will be described in detail by way of examples with reference to the accompanying drawings, in which:

FIG. 1 is a longitudinal section through the rotor film apparatus according to the invention;

FIG. 2 is a section taken along line II—II in FIG. 1 (apparatus cover removed);

Figure 4:
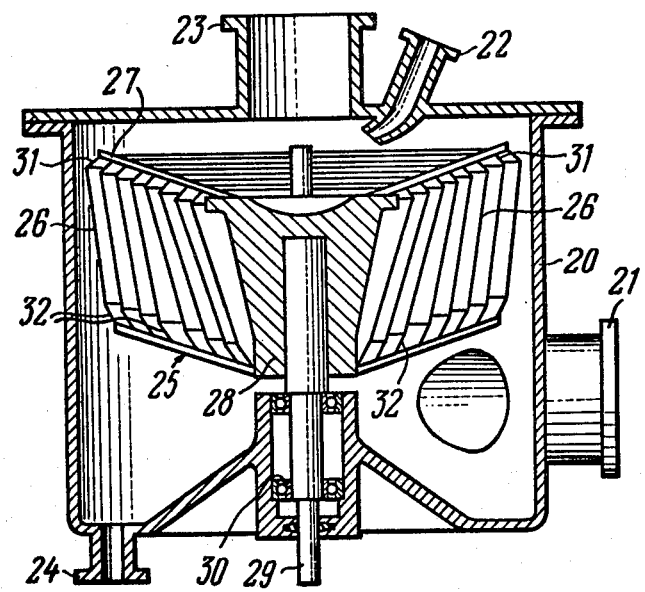
FIG. 4 is a longitudinal section through a version of the rotor film apparatus according to the invention.

The rotor film apparatus comprises a casing 1 (FIG. 1) with appliances intended to admit the primary products taking part in the process and to discharge the end products, said appliances including a gas inlet pipe connection 2, a liquid inlet pipe connection 3, a gas discharge pipe connection 4 and a liquid discharge pipe connection 5. The casing 1 accommodates a refluxing stage 6 whose refluxing surface consists of four long troughs 7 and four short troughs 7a (FIGS. 1,2). The axis of rotation of the refluxing stage 6 is oriented horizontally. The troughs 7, 7a are curved around the axis of the refluxing stage 6 in the form of an eight-start spiral resembling an Archimedean screw in plan as shown in FIG. 2. The hollows of the troughs 7 and 7a are located at the concave side of the spiral. The gaps between the adjacent loops of the spiral allow the passage of gas.

The left-hand side edge 8 (FIG. 1) and the right-hand side edge 9 of the troughs 7 and 7a serve to hold the liquid film on the inside surface of the troughs 7, 7a directed into the apparatus. The troughs 7, 7a are secured with the aid of radial bars 10 on a central sleeve 11 which has radial holes 12 and is made integral with a shaft 13. The holes 12 of the sleeve 11 distribute the liquid among the troughs 7, 7a of the refluxing stage 6. The shaft 13 is mounted in the apparatus casing 1 on bearings 14. This allows rotation of the refluxing stage 6 said rotation forcing the liquid to move in the form of a film over the inside surface of the troughs 7, 7a from the centre of the refluxing stage 6 to its periphery. The appliance for delivering liquid to the refluxing stage 6 has the form of a curvilinear pipe 15 fitted on the inner end of the liquid inlet pipe connection 3.

According to the invention, as the portions of the troughs 7, 7a depart gradually farther from the axis of the refluxing stage 6, they are displaced in one and the same direction parallel to the stage axis so that the refluxing stage 6 as a whole is shaped like a bowl. This shape of the refluxing stage 6 aids in trapping the liquid drops and streams created at the point where the liquid is delivered on the refluxing stage 6 from the pipe 15. The inside space of the "bowl" faces the gas (vapour) discharge pipe connection 4. As a result, the flow of gas leaving the refluxing stage 6 makes no sharp turns and encounters no sudden contractions.

Figure 3:
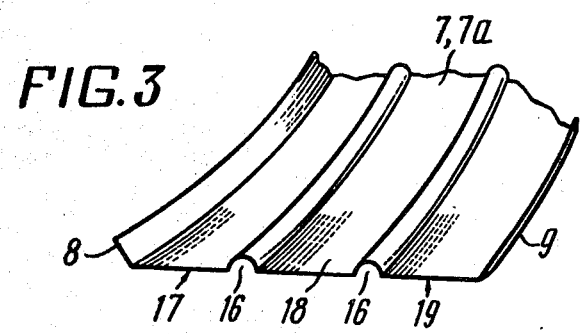
FIG. 3 is an isometric view of an element of the trough according to the invention, enlarged.

The troughs 7, 7a of the refluxing stage 6 are provided with longitudinal partitions 16 which divided said troughs into parallel channels 17, 18, 19 (FIG. 3). The partitions 16 are made in the form of ridges extruded in the troughs 7, 7a and intended to prevent accumulations of liquid at one of the side edges 8 or 9 of the troughs 7, 7a.

The troughs 7, 7a of the refluxing stage 6 (FIG. 2) end at different distances from its axis since said troughs are of different length. Each short trough 7a is located between two long troughs 7 and, conversely, each long trough 7 is placed between two short troughs 7a. Thus, the troughs 7, 7a of different length are arranged around the axis of the refluxing stage 6 in a periodically recurring sequence. Consequently, the trough spiral has eight starts in the centre of the refluxing stage 6 and four starts at its periphery so that the liquid flow is divided into eight streams in the centre of the refluxing stage 6 and into four streams at its periphery.

In other versions of the rotor film apparatus according to the invention the refluxing stage can be installed rotatably around a vertical axis as shown in FIG. 4.

In this case the rotor film apparatus has a vertical cylindrical casing 20 provided with appliances for admitting the primary products participating in the process and discharging the end products, said appliances including a gas inlet pipe connection 21, a liquid inlet pipe connection 22, a gas discharge pipe connection 23, and a liquid discharge pipe connection 24. The pipe connection 22 serves simultaneously as an appliance for delivering liquid onto the refluxing stage 25. The refluxing stage 25 has a refluxing surface consisting of troughs 26 of a uniform length. The troughs 26 are curved into a spiral which uncoils from the axis of the refluxing stage 25 and are secured by radial ribs 27 on a central sleeve 28. The refluxing stage 25 is installed on a vertical shaft 29 with the aid of the sleeve 28. The shaft 29, in its turn, is mounted on bearings 30 in the apparatus casing 20. This allows the refluxing stage 25 to rotate around the vertical axis and this rotation forces the liquid in the form of a film to move along the hollows of the troughs 26 from the centre of the apparatus to its periphery. The gaps between the troughs 26 serve for the passage of gas which comes in contact with the liquid film contained in the hollow of the troughs 26.

The portions of the troughs 26 are gradually displaced upward as they depart farther from the axis of the refluxing stage 25. This orientation of the refluxing stage 25 aids in trapping the splashes of liquid created at the point where said liquid falls on the refluxing stage 25 because in this case the force of gravity is directed towards the bottom of the "bowl" of the refluxing stage 25 and aids in curving the trajectory of splashes towards the troughs 26.

The troughs 26 of the refluxing stage 25 have an upper side edge 31 and a lower side edge 32 which hold the film on the inside surface of the troughs 26 directed towards the centre of the apparatus. According to the invention, the trough 26 is inclined so that its upper side edge 31 is located farther from the axis of the refluxing stage 25 than its lower side edge 32. Such an arrangement of the troughs 26 prevents the liquid film from being pressed against the lower side edge 32 of the trough 26 under the effect of inertia and gravity forces. This is conducive to a more uniform distribution of the liquid film across the entire width of the hollow in the trough 26 and increases the surface of contact between the gas and liquid.

Another version of the rotor film apparatus utilizes other features of the invention related to the employment, in particular, of the bowl-like shape of the refluxing stage for moving the liquid from some parts of the apparatus to its other parts and for heating the troughs which allows the process of liquid vaporization to be performed directly on the troughs.

In this case the rotor film apparatus also has a vertical casing 33 (FIG. 5) with appliances intended to admit the primary products taking part in the process and discharge the end products, said appliances including a liquid inlet pipe connection 34, a liquid discharge pipe connection 35 and a vapour discharge pipe connection 36. The pipe connection 34 serves simultaneously for delivering liquid to the refluxing stage 37.

The working surface of the refluxing stage 37 is made in the form of two troughs 38 curved into a double-start spiral uncoiling from the axis of the refluxing stage 37 and having gaps between its loops. The portions of the troughs 38 are displaced upward as they gradually depart from the axis of the refluxing stage 37. The trough 38 is inclined so that its upper side edge 39 is located farther from the axis of the refluxing stage 37 than its lower side edge 40.

Figure 5:
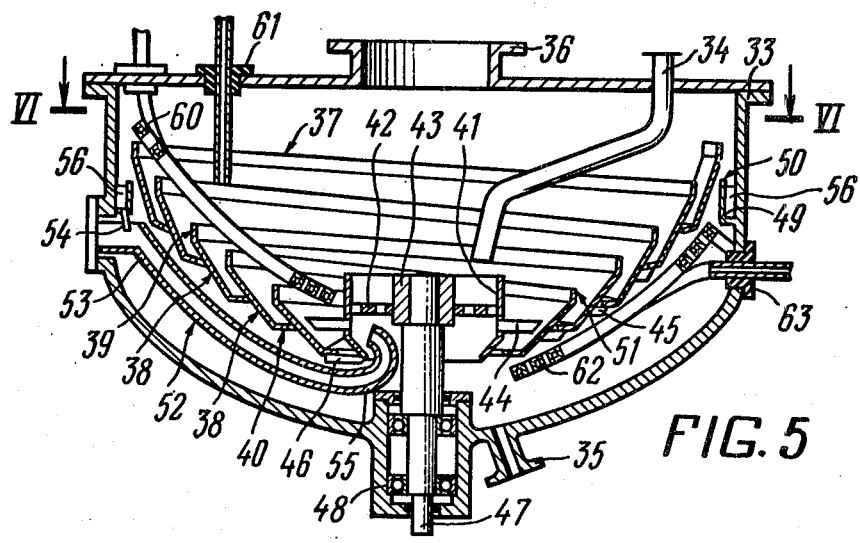
FIG. 5 is a longitudinal section through another version of the rotor film apparatus according to the invention.

The refluxing stage 37 has a central distributing sleeve 41 with a horizontal perforated partition 42. Said partition 42 is intended to fasten the sleeve 41 to the central mounting sleeve 43. The central distributing sleeve 41 receives the liquid delivered into the refluxing stage 37 and distributes it among the initial portions of the troughs 38. For this purpose the sleeve 41 is provided with radial discharge pipe connections 44 (FIGS. 5, 6) which are brought to the hollows of the troughs 8 at their initial portions. The troughs 38 are rigidly connected with one another by locks 45 (FIG. 5). The initial portions of the troughs 38 that are nearest to the axis of the refluxing stage 38 are connected with the central distributing sleeve 41 by stiffener ribs 46. The refluxing stage 37 is mounted on the vertical shaft 47 with the aid of the mounting sleeve 43. The shaft 47 is mounted in the apparatus casing 33 on bearings 48 to provide for the rotation of the refluxing stage 37.

Figure 6:
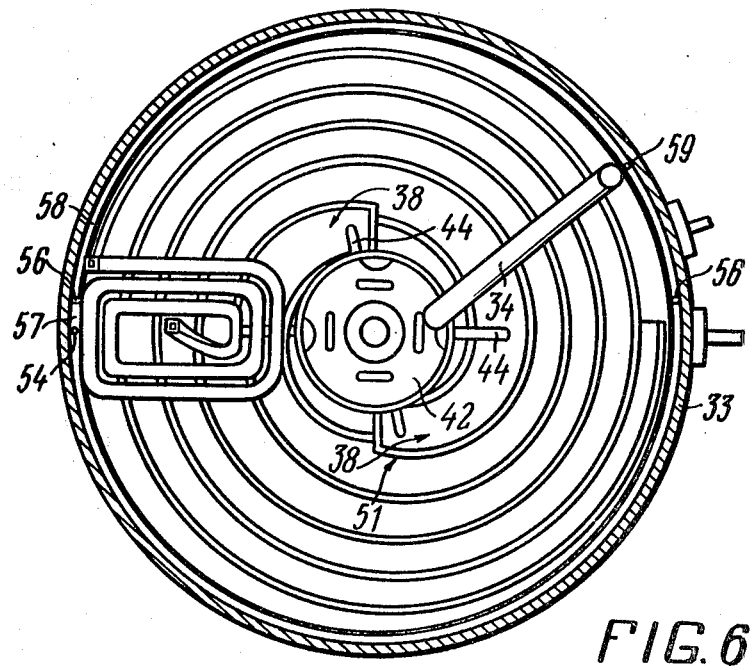
FIG. 6 is a section taken along line VI—VI in FIG. 5.

The inner side wall of the casing 33 is provided with a circular pocket 49 arranged around the refluxing stage 37 and adapted to receive the liquid thrown down from said refluxing stage. The upper edge 50 of the pocket 49 is set considerably higher than the upper side edge 51 of the initial portion of the trough 38. Due to the fact that individual portions of the trough 38 become higher as they gradually depart from the axis of the refluxing stage 37, the energy of rotation of the refluxing stage 37 is utilized partly for raising the liquid to a higher level against the action of the gravity force. Practical utilization of the increment of potential energy is impossible unless said increment is retained during further movement of the liquid that has left the refluxing stage. This occurs in the apparatus illustrated in FIG. 5 due to the above-mentioned arrangement of the upper edge 50 of the circular pocket 49. The liquid starts moving to the other parts of the apparatus from a higher level which ensures sufficient velocity of the liquid flow exclusively under the effect of the force of gravity. The central distributing sleeve 41 is open from underneath and there is an inclined recirculating pipe 52 under the refluxing stage 37. The upper end 53 of the recirculating pipe 52 communicates with the pocket 49 which receives the liquid thrown down from the refluxing stage 37. The pocket 49 is in communication with the recirculating pipe 52 through a discharge pipe connection 54 secured in the bottom of the pocket 49. The lower end 55 of the pipe 52 is inserted from underneath into the inner space of the distributing sleeve 41 which is open at the bottom. The pipe 52 conducts the liquid from the pocket 49 onto the refluxing stage 37, i.e. it ensures recirculation of the liquid on the refluxing stage 37. This recirculation is ensured by utilizing the additional potential energy acquired by the liquid while passing through the refluxing stage 37 whereas the location of the pocket 49 prevents wasteful losses of the potential energy of the liquid. Two inner vertical partitions 56 (FIGS. 5, 6) divide the circular pocket 49 into two compartments 57 and 58 (FIG. 6). The compartment 57 is communicated by the pipe connection 54 with the upper end 53 (FIG. 5) of the recirculating pipe 52. The compartment 58 (FIG. 6) has a hole 59 in its bottom intended to direct the liquid into the lower part of the apparatus. The ratio of the length of the compartment 57 to the entire perimeter of the circular pocket 49 (FIG. 5) is equal to the portion of the liquid that has to be returned onto the refluxing stage 37.

The troughs 38 of the refluxing stage 37 are made from a conducting material. Placed side by side with the upper side face of the refluxing stage 37 is an inducting wire 60 of a heating inductor, said wire being insulated electrically by bushings 61 from the refluxing stage 37 and the apparatus casing 33. A similar inducting wire 62 is placed under the refluxing stage 37. The wire 62 is insulated from the apparatus casing 33 by bushings 63. The inducting wires 60 and 62 are intended to induce a rapidly alternating electromagnetic field in close proximity to the troughs 38 of the refluxing stage 37, said field inducing eddy currents in the troughs 38 and thus heating the working surfaces of the latter. To reduce heating of the inducting wires 60, 62 proper, they are made hollow so that it is possible to cool them from inside with a circulating refrigerant. Such a design of the rotor film apparatus allows the process of vaporization of the liquid film to be performed directly on the troughs 38 of the refluxing stage 37 which, taken together, form an extensively developed heat-exchange surface. The bowl-like shape of the refluxing stage 37 in combination with inclination of the troughs 38 is conducive to a more efficient penetration of the magnetic flux to the largest possible surface of the troughs 38. This factor improves the heating of the troughs 38 at a given capacity of the heating inductor.

Figure 7:
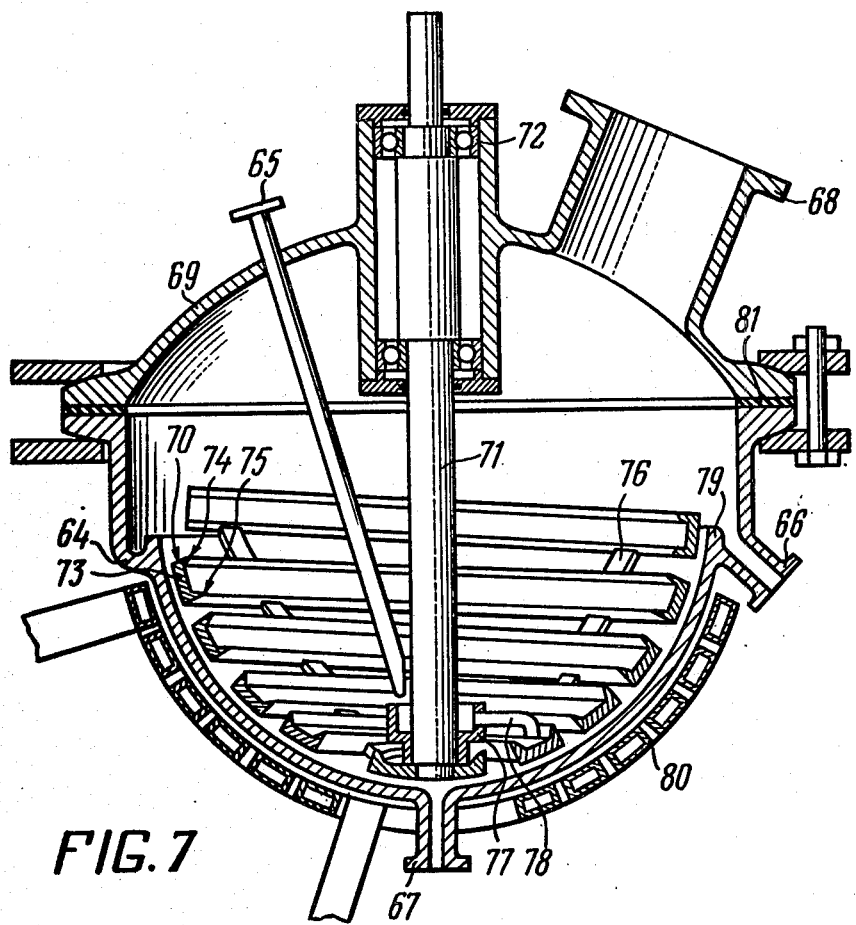
FIG. 7 is a longitudinal section through still another version of the rotor film apparatus according to the invention.

Another version of the rotor film apparatus shown in FIG. 7 displays further features of the invention related to improvement of said apparatus functioning in the capacity of a rotor film vaporizer. This apparatus has a casing 64 with appliances for admitting the primary products and discharging the end products, said appliances including a liquid inlet pipe connection 65, pipe connections 66, 67 for the discharge of liquid bottoms, and a vapour discharge pipe connection 68. The apparatus is closed on the top with a cover 69. The liquid inlet pipe connection 65 serves simultaneously for delivering the liquid on the refluxing stage 70. The refluxing stage 70 is mounted on a vertical shaft 71 installed on bearings 72 in the cover 69 of the apparatus casing 64.

The refluxing stage 70 is formed by one trough 73 curved into a single-start spiral uncoiling from the axis of the refluxing stage 70 and having gaps between its loops. The portions of the trough 73 are displaced upward as they gradually depart from the axis of the refluxing stage 70. The trough 73 is inclined so that its upper side edge 74 is located farther from the shaft 71 than its lower side edge 75. The various portions of the trough 73 are interconnected by tie-pieces 76. The end of the trough 73 nearest to the axis of the refluxing stage 70 is fitted on the lower end of the shaft 71. The sleeve 77 installed on the shaft 71 above the initial portion of the trough 73 is provided with a radial pipe connection 78 brought to the hollow of the trough 73 at its initial portion. The sleeve 77 serves to trap the liquid delivered from the pipe connection 65.

A circular pocket 79 arranged around the refluxing stage 70 on the inner side wall of the casing 64 receives the liquid thrown down from the refluxing stage 70. The pocket communicates with the pipe connection 66 which discharges the liquid from the apparatus. The pipe connection 67 is a stand-by one and is intended for discharging the liquid that has found its way for some reason into the lower part of the apparatus.

The various portions of the trough 73 are inclined so that the bottom of the trough 73 touches upon an imaginary surface of revolution whose geometrical axis coincides with the rotation axis of the refluxing stage 70. Such a design of the refluxing stage 70 simplifies its manufacture. The refluxing stage 70 can be turned first in the form of a bowl while the hollows of the troughs 73 and the cutouts between the loops of the spiral trough 73 can be made afterwards, when the manufacture of the bowl has been completed. Installed opposite the lower face surface of the refluxing stage 70 is an inducting wire 80 of the induction heater, said wire being wound into a coil. Such a shape of the refluxing stage 70 still improves further the accessibility of various portions of the trough 73 to the alternating magnetic flux created by the inducting wire 80 and increases the heat transfer from the refluxing stage 70. Between the inducting wire 80 and the refluxing stage 70 there is a shield of a nonconducting material, e.g. glass, the function of the shield being fulfilled by the apparatus casing 64 proper, made of a nonconducting material, e.g. glass.

The inducting wire 80 is then located outside the apparatus casing 64. Such a design of the apparatus makes it possible to protect the inducting wire 80 against the effect of splashes and vapours of the processed liquid. The apparatus cover 69 may be made of any material, e.g. metal. The joint between the metal cover 69 and the apparatus casing 64 is made pressure-tight with the aid of a soft gasket 81 clamped between the flanges of the casing 64 and cover 69.

Figure 8:
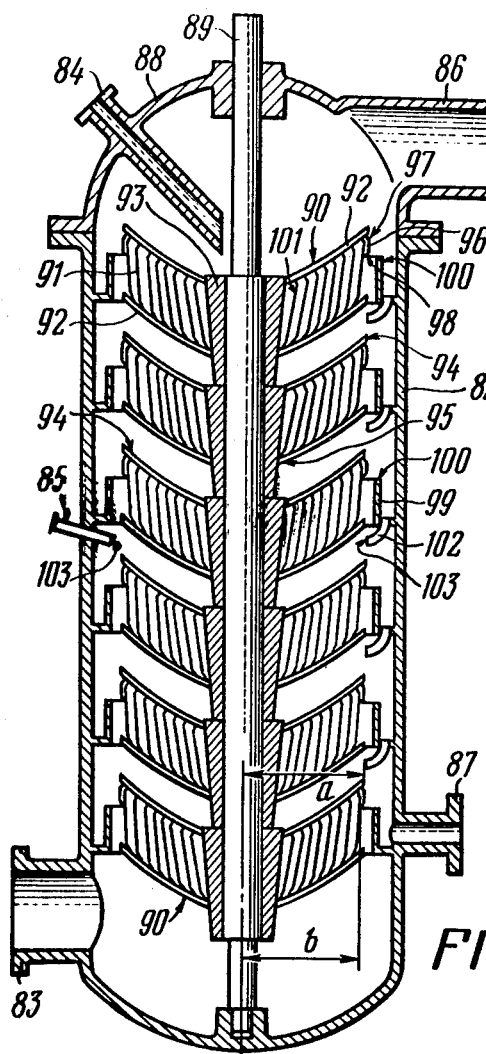
FIG. 8 is a longitudinal section through an additional version of the rotor film apparatus according to the invention.

Another version of the rotor film apparatus comprises a number of refluxing stages (FIG. 8). This apparatus is designed for the process of rectification. It consists of a vertical cylindrical casing 82 with appliances for admitting the primary products and discharging the end products, said appliances including a vapour inlet pipe connection 83, a reflux inlet pipe connection 84, a pipe connection 85 for admitting the liquid mixture to be separated, a vapour discharge pipe connection 86 and a liquid discharge pipe connection 87. The casing 82 is provided with a cover 88. The shaft 89 carrying the refluxing stages 90 is mounted rotatably and coaxially in the casing 82.

The pipe connections 84, 85 are arranged so that they serve simultaneously for delivering the liquid to the refluxing stages 90. Said stages 90 are formed by spiral troughs 91 which are connected by radial ribs 92 with the central mounting sleeve 93. The refluxing stages 90 are secured on the shaft 89 one above another so that the upper edge 94 of one refluxing stage 90 is higher than the lower edge 95 of the overlying refluxing stage 90. In this arrangement of the refluxing stages 90 the liquid slipping off from one refluxing stage 90 falls on the underlying refluxing stage 90.

Figure 9:
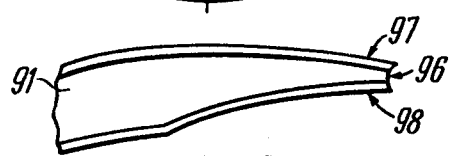
FIG. 9 is an isometric view of the peripheral end of the apparatus trough shown in FIG. 8, enlarged.

The portions of the troughs 91 adjoining their peripheral ends 96 (FIGS. 8, 9) are tapered off so that the distance between the upper 97 and lower 98 side edges of said portions gradually decreases towards the end 96 of the trough 91. The upper side edge 97 of the trough 91 on the tapered portion of the trough 91 adjoins the vertical radial rib 92 (FIG. 8) of the refluxing stage 90. Circular pockets 99 installed on the side wall of the casing 82 around the refluxing stages 90 receive the liquid thrown down from the refluxing stages 90 through the ends 96 of the troughs 91 during rotation of the refluxing stages 90. The upper edge 100 of the circular pocket 99 is arranged somewhat lower than the peripheral end 96 of the trough 91 of the corresponding refluxing stage 90 but higher than the upper side edge 101 of the first loop of the spiral trough 90. This ensures trapping of the liquid thrown down from the refluxing stage 90 at the highest possible level.

The appliances for delivering the liquid to the refluxing stages 90 of the apparatus, except the reflux pipe connection 84, secured in the cover 88, include the pipe connections 85 and 102 secured on the side wall of the apparatus casing 82.

The pipe connection 85 serves simultaneously for delivering the feed liquid into the apparatus. The pipe connections 102 delivering the liquid to the refluxing stages 90 communicate with the circular pockets 99 intended to receive the liquid from the corresponding refluxing stages 90. The discharge ends 103 of the pipe connections 85 and 102 are directed into the space between the refluxing stages 90.

Thus, the pipe connections 102 together with the circular pockets 99 conduct the liquid which flows under the force of gravity from one refluxing stage 90 to another.

The length of the pipe connections 85 and 102 secured on the side wall of the apparatus casing 82 is such that their discharge ends 103 are located at a distance "a" from the axis of the refluxing stage 90 said distance "a" being larger than the minimum distance "b" from the axis of the refluxing stage 90 to its periphery. This design of the apparatus facilitates its assembly and dismantling and promotes its reliability.

In another version of the multiple-stage rotor film apparatus the appliance for delivering the liquid to the refluxing stage is not connected with the apparatus casing but rotates jointly with the refluxing stage. This apparatus is designed for rectification. It comprises a vertical cylindrical casing 104 (FIG. 10) with a pipe connection 105 for admitting the primary liquid mixture into the apparatus, a reflux inlet pipe connection 106, a liquid discharge pipe connection 107, a vapour inlet pipe connection 108 and a vapour discharge pipe connection 109. On top, the casing is closed by a cover 110. The lower part of the casing 104 is provided with a circular pocket 111 for accumulating the liquid. Installed coaxially and rotatably in the casing 104 is a shaft 112 carrying the refluxing stages 113.

Each refluxing stage 113 comprises two troughs 114 which, taken together, form a double-start spiral.

The inclination of the various parts of the trough 114 is selected so that the upper side edge 115 of the trough 114 is located farther from the shaft 112 than the lower side edge 116. In addition, the height of the portions of the trough 114 increases gradually as said parts depart farther from the shaft 112 so that the refluxing stage 113 as a whole is shaped like a bowl. The troughs 114 are connected by inclined radial bars 117 (FIGS. 10, 11) with the central mounting sleeve 118. The upper edge 119 (FIG. 10) of one refluxing stage 113 is arranged considerably higher than the lower edge 120 of the other overlying refluxing stage 113; as a result, the liquid that has slipped for some reason from any refluxing stage 113 falls down on the underlying refluxing stage 113.

The space between the refluxing stages 113 accommodates two overflow pipes 121 connected with the refluxing stages 113. The pipes 121 deliver the liquid to the underlying refluxing stage 113 from the overlying refluxing stage 113. The upper out-flowing open ends 122 of the overflow pipes 121 adjoin the peripheral ends 123 of the troughs 114 of the overlying refluxing stage 113. The lower ends 124 of the pipes 121 are brought to the initial portions of the troughs 114. The design of the apparatus allows its rotor to be taken out as an integral unit after removing the apparatus cover 110, said rotor comprising the shaft 112, refluxing stages 113 and overflow pipes 121.

In another version of the multiple-stage rotor film apparatus the space between the refluxing stages is used additionally for the process of mass exchange. This apparatus consists of a vertical casing 125 (FIG. 12) accommodating a shaft 126 mounted coaxially and rotatably and carrying the refluxing stages 127. The appliances for admitting gas and liquid into the apparatus are not shown in the drawing since the latter illustrates only a portion of said apparatus. The appliances for delivering the liquid to the refluxing stages 127 have the form of inclined radial pipe connections 128 communicating with the overlying circular pockets 129.

Figure 13:
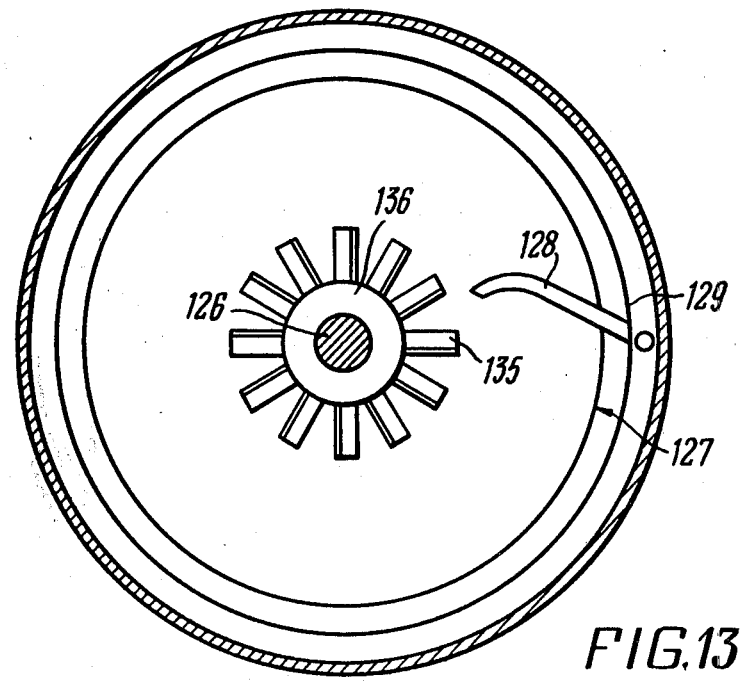
FIG. 13 is a section taken along line XIII—XIII in FIG. 12.

The pockets 129 trap the liquid flowing from the refluxing stages 127. The refluxing stages 127 are formed by troughs 130 wound spirally around the shaft 126. The troughs 130 are connected by inclined radial bars 131 with a central mounting sleeve 132. The refluxing stages 127 are shaped like a bowl and located so that the upper edge 133 of one of them is higher than the lower edge 134 of the overlying refluxing stage 127. To ensure head-on collision of the liquid spray flowing out of the pipe connection 128 with baffles 135 the lower (discharge) ends of the pipe connections are somewhat curved towards the baffles 135 as shown in FIG. 13.

In one of the probable versions of the multiple-stage rotor film apparatus the liquid is recirculated on each refluxing stage and the liquid film is subjected to turbulent agitation directly in the hollows of the troughs of the refluxing stage. Such an apparatus is designed for processes with participation of liquids and gases in case of limited liquid flow rates, for example for rectification of thermally unstable products at a residual pressure of 1–10 mm of mercury or for wet purification of gases from dust. The apparatus comprises a vertical cylindrical casing 137 (FIG. 14) accommodating a shaft 138 arranged coaxially and rotatably and carrying refluxing stages 139. The refluxing stages 139 are bowl-shaped and formed by spiral troughs 140 which are connected by inclined radial bars 141 with the central distributing sleeve 142. The sleeve 142 traps the liquid delivered to the refluxing stage 139 and distributes it among the troughs 140. The sleeve 142 is made in the form of a cone flaring out towards the top and is connected by stiffener ribs 143 with the central mounting sleeve 144 mounted on the shaft 138. The inner space of the distributing sleeve 144 has a lateral partition 145 mounted short of the sleeve walls. The partition 145 prevents the liquid delivered onto the refluxing stage 139 from falling down and keeps the gas from flowing through the circular channel formed by the sleeves 142 and 144 because the flow of gas should cross the refluxing stage 139 mainly through the gaps between its spiral troughs 140. The drawing illustrates only the middle portion of the apparatus and does not, therefore, show the pipe connections for admitting the liquid and gas into the apparatus and for discharging the end products therefrom. The appliances for admitting liquid to the refluxing stages 139 have the form of inclined radial pipe connections 146 plugged at the lower end 147. According to the invention, the pipe connections 146 are provided with a number of discharge holes 148, 149 located at different distances from the axis of the refluxing stage 139, said distances not exceeding the radius of the refluxing stage 139. One of the holes 149 is made in the plugged lower end 147 of the pipe connection 146. The holes 148, 149 are intended to deliver liquid to the refluxing stage 139 at different points. The hole 149 delivers part of the liquid onto the partition 145 and further on the central distributing sleeve 142 whereas the holes 148 deliver the liquid directly onto the troughs 140. The delivery of the liquid onto the upper side edges 150 of the troughs 140 during purification of gas from dust may prove extremely useful to prevent accumulation of dust on the upper side edges 150 of the troughs 140. If the apparatus is used for rectification, the liquid film moving through the hollows of the troughs 140 is subjected to additional turbulent agitation by the sprays of liquid flowing out of the holes 148 in the pipe connection 146. This raises the efficiency of mass- and heat exchange.

Owing to the bowl-like shape of the refluxing stage 139, the delivery of liquid directly on its troughs 140 will rule out partial slipping of the liquid past the refluxing stage 139.

Secured on the side wall of the apparatus casing 137 above the pipe connections 146 are circular pockets 151. The bottoms of the pockets 151 are provided with pipe connections 152 for discharging the liquid from the pockets 151 on the inclined radial pipe connections 146. Besides, there are inclined recirculating pipes 153 located between the refluxing stages 139; the upper ends 154 of said recirculating pipes 153 are in communication with the circular pockets 151 while pipe connections 155 conduct the liquid from the pockets 151 into the pipes 153.

Lower ends 156 of the recirculating pipes 153 are curved upward and inserted from underneath into the inside space of the central distributing sleeves 142. Thus, the recirculating pipes 153 are designed to return the liquid thrown from the refluxing stage 139 on the same refluxing stage 139.

The rotor film apparatus according to the invention, the version shown in FIG. 1, functions as follows.

The shaft 13 carrying the refluxing stage 6 is rotated by a drive (not shown in the drawing). The liquid is delivered through the pipe connection 3 and pipe 15 into the centre of the rotating refluxing stage 6. Through the holes 12 in the walls of the sleeve 9 the liquid is thrown on the inner ends of the troughs 7, 7a and flows through the hollows of said troughs under the effect of centrifugal forces from the centre to the periphery of the refluxing stage 6. The bowl-like shape of the refluxing stage 6 eliminates completely the falling of the liquid under the effect of gravity forces into the lower part of the apparatus past the troughs 7, 7a. If the inner space of the central sleeve 11 gets overfilled, the surplus liquid overflowing the edge of the sleeve 11 will by all means be trapped by the troughs 7, 7a of the refluxing stage 6 because said troughs form a natural barrier to the liquid flow. The same will occur with the liquid splashes created at the point where the liquid falls on the rotating refluxing stage 6. The longitudinal partitions 16 contribute to a more uniform distribution of liquid across the width of the troughs 7, 7a. The liquid is distributed through the holes 12 in the wall of the sleeve 11 in approximately equal streams among the channels 17, 18 and 19 of the trough. The longitudinal partitions 16 keep the liquid from flowing from one parallel channel 17, 18, 19 into another thus ensuring a continuous liquid film across the entire width of the troughs 7, 7a. If there were no partitions 16, the liquid would accumulate at the right-hand side edge 9 of the trough 7, 7a under the effect of inertia forces whereas the portions of the trough 7, 7a adjoining its left-hand side edge 8 would be exposed. Said inertia forces arise due to the bowl-like shape of the refluxing stage 6. Being acted upon by centrifugal forces, the liquid film has a tendency to move over a trajectory lying in the plane perpendicular to the rotation axis of the refluxing stage 6. However, as the left-hand side edge 8 of the trough 7, 7a departs farther from the axis of the refluxing stage, it keeps deviating to the left from the plane perpendicular to the rotation axis of the refluxing stage 6 due to the leftward displacement of the spiral loops along the axis of the refluxing stage 6. The liquid has a natural tendency to move away from the left-hand side edge 8 and in so doing it comes onto the right-hand side edge 9 of the trough 7, 7a. The partitions 16 interfere with transverse flow of liquid along the troughs 7, 7a. In the version shown in FIG. 2 the refluxing stage 6 has four short troughs 7a and four long troughs 7 so that near the axis of the refluxing stage 6 the liquid flows in the form of eight independent streams while nearer to the periphery of said stage 6 it flows only as four independent streams (corresponding to the number of the troughs). Thus, in the centre of the refluxing stage 6, where the centrifugal forces are considerably weaker than at its periphery, the troughs pass only 50% of the liquid as compared with the troughs at the periphery of the stage 6. This makes up for the lack of centrifugal forces that keep the liquid in the hollows of the troughs 7, 7a located in the centre of the refluxing stage 6.

The liquid is thrown from the periphery of the refluxing stage 6 onto the walls of the casing 1 and drips from them down into the lower part of the apparatus wherefrom it is discharged outside through the pipe connection 5. The gas (or vapour) enters the apparatus through the pipe connection 2 and passes through the gaps between the troughs 7, 7a of the refluxing stage 6, contacting the liquid film which covers the bottom of the troughs 7, 7a. The gas is discharged from the apparatus through the pipe connection 4 (FIG. 1).

The rotor film apparatus according to the invention, the version shown in FIG. 4, functions as follows. The refluxing stage 25 is set in rotation around the vertical axis by a drive (not shown in the drawing). The liquid is delivered through the pipe connection 22 from above into the centre of the refluxing stage 25, on its central sleeve 28. Being deflected from the upper end of the sleeve 28, the liquid flows under the effect of centrifugal and gravity forces in the form of streams and splashes on the nearest portions of the troughs 26 and is kept in the hollows thereof limited by the side edges 31, 32 due to the effect of centrifugal forces. Inclination of the troughs 26 to the shaft 29 contributes to the formation of a homogeneous thin layer of liquid in the hollows of the troughs 26 throughout their width from one side edge 32 to the other side edge 31. The liquid is thrown from the periphery of the rotating refluxing stage 25 onto the vertical walls of the casing 20. The force of gravity directs the liquid into the lower part of the casing 20 wherefrom it is discharged outside through the pipe connection 24. The gas (or vapour) enters the apparatus through the pipe connection 21 and passes through the gaps between the troughs 26 of the refluxing stage 25 thus contacting the liquid film which moves in the hollows of the troughs 26. Then the gas is discharged from the apparatus through the pipe connection 23.

The rotor film apparatus according to the invention, the version illustrated in FIG. 5, is designed to vaporize the liquid in the film and functions as follows. The refluxing stage 37 is set in rotation around a vertical axis. The inducting wires 60, 62 are connected to A.C. supply and induce eddy currents in the troughs 38. The liquid is delivered from above through the pipe connection 34 into the distributing sleeve 41 of the refluxing stage 37. Then the liquid is thrown through the discharge pipe connections 44 under the effect of centrifugal forces onto the initial portions of the troughs 38 and spreads in the form of a film over the hollows of the troughs 38. The centrifugal forces move the liquid towards the periphery of the refluxing stage 37. This is accompanied by evaporation of the liquid on the heated troughs 38. The remaining liquid is thrown into the circular pocket 49 which is divided by two partitions 56 into two compartments 57 and 58 (FIG. 6). From the compartment 57 the liquid flows through the pipe connection 54 into the upper end 53 (FIG. 5) of the recirculating pipe 52. Through the lower curved end 55 of the pipe 52 the liquid enters from underneath into the distributing sleeve 41 and returns through the radial discharge pipe connections 44 on the initial portions of the troughs 38 as the recirculating stream. From the compartment 58 (FIG. 6) the liquid bottoms flow through the hole 59 into the lower part of the apparatus wherefrom they are discharged through the unloading pipe connection 35 (FIG. 5). The vapours formed by vaporization of the liquid are removed from the apparatus through the pipe connection 36.

The rotor film apparatus realized in compliance with FIG. 7 functions as follows. The refluxing stage 70 is set in rotation. The liquid is delivered through the inlet pipe connection 65 into the sleeve 77 from which it flows through the radial pipe connection 78 into the trough 73. Moving from the centre to the periphery of the refluxing stage 70, part of the liquid evaporates due to the contact with the heated trough 73. The remaining liquid is discharged from the apparatus through the pipe connection 66.

The multiple-stage rectifying rotor-type apparatus in the version illustrated in FIG. 8 operates as follows. The vapour enters the apparatus through the pipe connection 83 and, being enriched in a highly-volatile component, is discharged through the pipe connection 86. The reflux is delivered onto the upper refluxing stage 90 through the pipe connection 84 while the primary mixture of the products to be separated, i.e. the feed liquid, is introduced into the middle of the tower through the pipe connection 85 with a small positive head which is sufficient to form the spray of liquid possessing a certain initial velocity. This velocity is sufficient for delivering the liquid onto the central part of the refluxing stage 90 because the bowl-like shape of the refluxing stages 90 creates a gap between them providing enough room for the approximately parabolic trajectory of the flying liquid spray.

The liquid head required for forming the spray at the outlet from the pipe connections 102 is ensured by the sufficient height of the circular pockets 99 and by the sufficiently small diameter of the pipe connections 102. The liquid moves from the upper part of the apparatus into its lower part, flowing from one refluxing stage 90 onto another and leaves the apparatus through the pipe connection 87.

Figure 10:
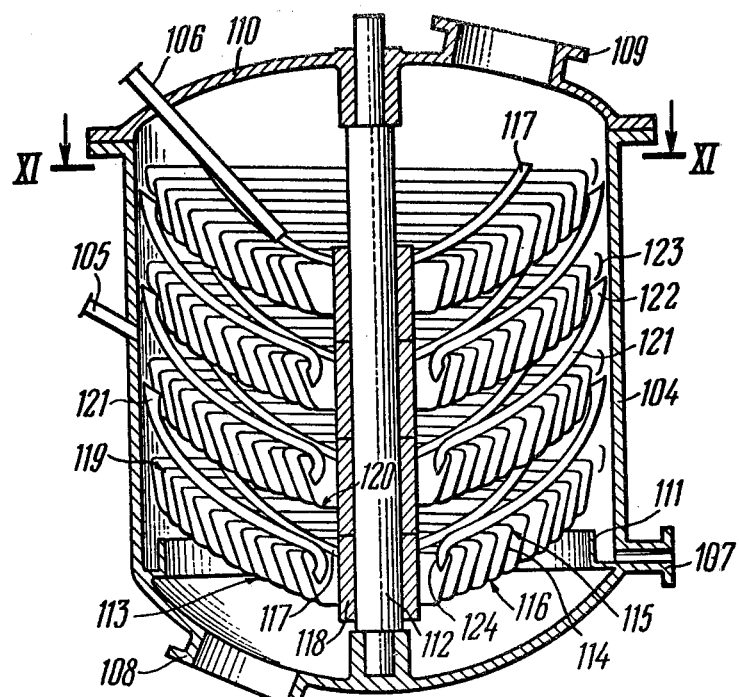
FIG. 10 is a longitudinal section through still another version of the rotor film apparatus according to the invention.
Figure 11:
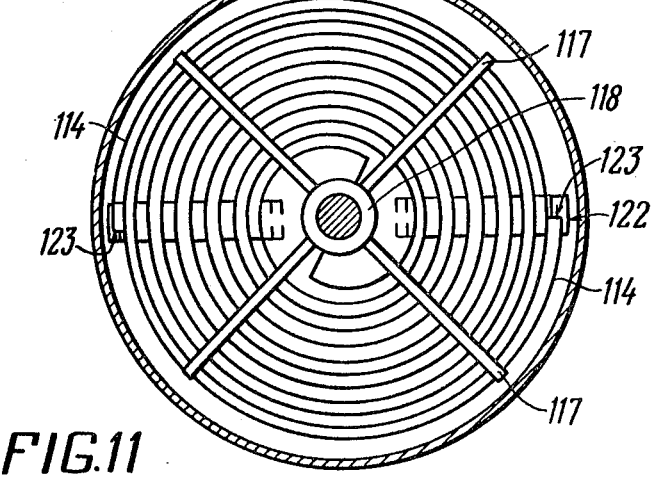
FIG. 11 is a section taken along line XI—XI in FIG. 10.

In the version illustrated in FIG. 10 the apparatus functions as follows. The shaft 112 is set in rotation. The primary liquid mixture is delivered under a small positive head through the pipe connection 105 onto the underlying rotating refluxing stage 113. The liquid accumulates in the hollows of the troughs 114 and is moved by the centrifugal forces in the form of a film along the troughs 114 from the center of the refluxing stage 113 to its periphery. The reflux enters the uppermost refluxing stage 113 through the pipe connection 106. From the peripheral ends 123 of the troughs 114 the liquid flows into the upper ends 122 of the pipes 121 after which it flows under the force of gravity through the pipes 121 to the center of the underlying refluxing stage 113. The speed of the shaft 112 in the operating apparatus is sufficient for moving the liquid by the centrifugal forces upward through the spiral troughs 113.

At the same time this speed has a limitation; it should not be too high, otherwise the effect of the force of gravity will prove insufficient for overcoming the centrifugal forces while the liquid moves in the pipe 121 from the periphery to the center of the refluxing state 113. Simultaneous movement of the liquid upward through the spiral trough 114 and downward through the pipe 121 is possible at a certain rotation speed of the shaft 112 if the sense of rotation of the refluxing stage 113 coincides with the winding direction of the spiral trough 114. Under these conditions the upward movement of the liquid over the spiral trough 114 will be assisted, in addition to the centrifugal forces caused by rotation of the refluxing stage 113, by the Coriolis forces which are practically nonexistent when the liquid moves through the pipe 121. Conversely, the upward movement of the liquid through the pipe 121 under the effect of centrifugal forces is opposed by the weight of the static column of liquid filling the pipe 121 both throughout its length and across its section. Of course, the inside diameter of the pipe 121 should be selected so that at a given rate of liquid flow the liquid would fill completely its cross section. As for the movement of the liquid film upward through the spiral trough 114, in this case the opposing effect of the "static column" is nonexistent. The liquid flows from the pipes 121 onto the initial portions of the troughs 114 of the underlying refluxing stage 113 and restarts its movement along a spiral from the center of the apparatus to its periphery. From the downmost refluxing stage 113 the liquid is thrown into the circular pocket 111 and discharged from the apparatus through the pipe connection 107. The vapour moves in the apparatus from underneath upward, from the pipe connection 108 to the pipe connection 109. As the flow of vapour crosses the refluxing stages 113, the vapour comes in contact with the liquid film in the gaps between the troughs 114. Rising, the vapour is enriched in the highly-volatile component.

Figure 12:
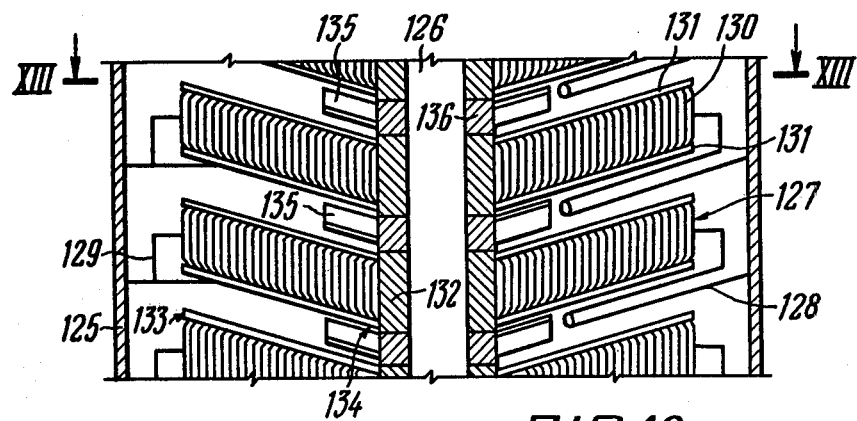
FIG. 12 is a longitudinal section through another version of the rotor film apparatus according to the invention.

During the mass- and heat exchange in the liquid-gas system, the apparatus shown in FIG. 12 functions as follows. The gas moves from the bottom of the apparatus upward, crossing the stages 27 and, while passing through the gaps between the troughs 130, comes in contact with the liquid film in the hollows of the troughs 130. The liquid is delivered into the apparatus from above through the delivery appliances not shown in the drawing. From the refluxing stages 127 the liquid is thrown into the circular pockets 129 wherefrom it flows into the underlying radial pipe connections 128. The latter direct the liquid at the baffles 135. Rotating, the baffles 135 break the liquid spray flowing from the pipe connection 128 into splashes and deflect them upward. The liquid drops are scattered in the space between the refluxing stages 127 thus creating an additional mass-exchange surface. Some of the drops fall under the effect of the gravity force on the underlying refluxing stage 127 and are entrained by the rotating spiral troughs 130. Other drops (particularly small ones) are entrained by the rising gas flow or simply deflected by the baffles 135 onto the overlying refluxing stage 127. In both cases this returns the liquid onto the overlying refluxing stage 127, i.e. causes partial recirculation of the liquid on the overlying refluxing stage 127.

In this case the mass exchange takes place both in the gaps between the troughs 130 and in the space between the refluxing stages 127. This increases the utilization factor of the inside volume of the apparatus.

Figure 14:
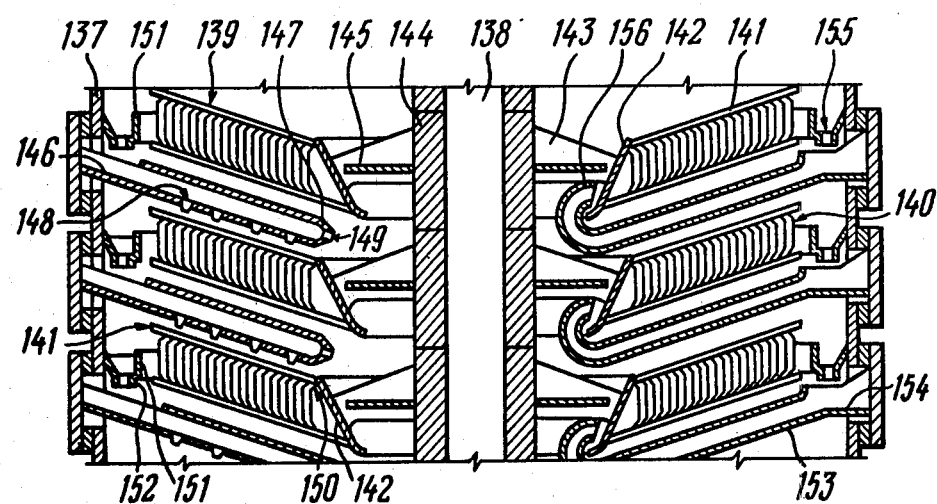
FIG. 14 is a longitudinal section through still another version of the rotor film apparatus according to the invention.

The multiple-stage rotor film apparatus in the version shown in FIG. 14 can be used for wet purification of gas from dust or for vacuum rectification under a residual pressure of 1–10 mm of mercury.

In the process of wet dust trapping the apparatus functions as follows. The dust-laden gas moves in the apparatus from underneath upward.

As the refluxing stages 139 rotate together with the shaft 138, the liquid, e.g. water, flows under the effect of centrifugal forces through the spiral troughs 140 from the axis to the periphery of the refluxing stages 139. From the periphery of each refluxing stage 139 the liquid is thrown onto the walls of the casing 137 and accumulates in the pockets 151.

The liquid contained in one comparment of the pocket 151 flows through the pipe connection 152 into the inclined radial pipe connection 146. From here the smaller portion of the liquid flows down on the partition 145 of the refluxing stage 139 and further, through the central distributing sleeve 142, onto the troughs 140 of the refluxing stage 139. The larger portion of the liquid flows from the pipe connection 146 through the holes 148 on the upper edges 150 of the troughs 140, washing the dust trapped from the gas flow down into the hollows of the troughs 140 from their edges 150.

From the other compartment of the pocket 151 the liquid flows through the pipe connection 155 into the recirculating pipe 153 and through its lower end 156 it enters the central distributing sleeve 142. Then the liquid returns over the upper edge of the sleeve 142 onto the troughs 140 of the initial refluxing stage 139.

The dust-laden gas moves in the apparatus from the bottom up. Crossing the refluxing stages 139, the gas flow untwists together with the stage 139 and comes in contact with the liquid film covering the hollows of the spiral troughs 140. Acted upon by the centrifugal forces, the particles of dust suspended in the gas flow settle on the surface of the liquid covering the hollows of the troughs 140 and are carried away together with the liquid. The dust that has settled on the upper side edges 150 of the troughs 140 is washed off by the spray of liquid flowing out of the pipe connections 146. Recirculation of liquid on each refluxing stage 139 ensures efficient wetting of the latter even at limited rates of liquid flow. Flowing from the upper part of the apparatus into the lower one through all the refluxing stages 139, the liquid is increasingly saturated with impurities trapped from the gas flow. The liquid thrown down from the lowermost refluxing stage 139 is considered to be spent. It is discharged from the apparatus through the unloading pipe connection (not shown in the drawing) for reclaiming. Due to the possibility of dust trapping in the apparatus according to FIG. 14 even at very low rates of liquid flow, the liquid discharged from the apparatus for reclaiming will have a maximum concentration of dirt settled from the gas flow. This will cheapen the process of liquid reclaiming. After reclaiming, the liquid returns to the upper part of the apparatus while the purified gas is discharged from the upper part of the apparatus through conventional pipe connections (not shown in the drawings).

When the apparatus is used for rectification or absorption, the routes of gas and liquid flow are the same. In these processes refluxing of the upper edges 150 of the troughs 140 with liquid from the holes 148 of the pipe connection 146 leads to turbulent agitation of the liquid film moving through the trough hollows. This results in better efficiency of mass- and heat exchange in the film.

What we claim is:

1. A rotor film apparatus for processes with participation of liquid and gas comprising: a casing; at least one refluxing stage mounted in said casing with a provision for rotating around its own axis; at least one trough forming said refluxing stage and curved into a spiral which uncoils from the axis of the refluxing stage and has a gap between its loops for the passage of gas; said trough whose hollow is located at the concave side of said spiral and intended to create a liquid film; portions of said trough gradually departing from the axis of said refluxing stage are displaced in one direction parallel to said axis so that said refluxing stage is shaped like a bowl; an appliance mounted on said casing for delivering liquid to said refluxing stage.

2. A rotor film apparatus according to claim 1 wherein said trough is provided with longitudinal partitions located at the side of its hollow and dividing it into several parallel channels.

3. A rotor film apparatus according to claim 1 wherein said refluxing stage is formed by several troughs of a different length and ending at different distances from said axis of the refluxing stage, said troughs of different length being arranged around said axis in a periodically recurring sequence.

4. A rotor film apparatus according to claim 1 wherein said axis of the refluxing stage is set vertically so that the portions of the trough of said refluxing stage are displaced upward as they gradually depart from said axis of said refluxing stage.

5. A rotor film apparatus according to claim 4 wherein said trough of the refluxing stage is inclined so that its upper side edge is located farther from said axis of the refluxing stage than its lower side edge.

6. A rotor film apparatus according to claim 5 wherein there is a circular pocket secured on the inner side wall of said casing around said refluxing stage and intended to receive the liquid thrown down from the latter, the upper edge of said pocket being located higher than the upper side edge of the initial portion of said trough of the same refluxing stage.

7. A rotor film apparatus according to claim 6 comprising a central distributing sleeve secured on said refluxing stage and open underneath; an inclined recirculating pipe installed under said refluxing stage; the upper end of said recirculating pipe communicating with said circular pocket for receiving the liquid thrown down from said refluxing stage; the lower end of said recirculating pipe inserted from underneath into said distributing sleeve of the refluxing stage.

8. A rotor film apparatus according to claim 7 wherein said trough of the refluxing stage is made of a conducting material and there is an inducting wire of a heating inductor, said wire being located opposite at least one side face of of said refluxing stage and insulated electrically from said refluxing stage and said apparatus casing.

9. A rotor film apparatus according to claim 6 wherein said trough of the refluxing stage is made of a conducting material and there is an inducting wire of a heating inductor, said wire being located opposite at least one face side of the refluxing stage and insulated electrically from said refluxing stage and said apparatus casing.

10. A rotor film apparatus according to claim 4 wherein there is a circular pocket secured on the inner side wall of said casing around said refluxing stage and intended to receive the liquid thrown down from the latter, the upper edge of said pocket being located higher than the upper side edge of the initial portion of said trough of the same refluxing stage.

11. A rotor film apparatus according to claim 10 comprising a central distributing sleeve secured on said refluxing stage and open underneath; an inclined recirculating pipe installed under said refluxing stage; the upper end of said recirculating pipe communicating with said circular pocket for receiving the liquid thrown down from said refluxing stage; the lower end of said recirculating pipe inserted from underneath into said distributing sleeve of the refluxing stage.

12. A rotor film apparatus according to claim 5 wherein said trough of the refluxing stage is made of a conducting material and there is an inducting wire of a heating inductor, said wire being located opposite at least one side face of the refluxing stage and insulated electrically from said refluxing stage and said apparatus casing.

13. A rotor film apparatus according to claim 12 wherein the inclination of various portions of said trough is selected so that the trough bottom touches upon an imaginary surface of revolution whose geometrical axis coincides with the rotation axis of said refluxing stage formed by said trough.

14. A rotor film apparatus according to claim 13 wherein there is a shield of a nonconducting material arranged between said inducting wire of the heating inductor and said refluxing stage.

15. A rotor film apparatus according to claim 14 wherein said inducting wire of the heating inductor is located outside the apparatus casing and the casing proper is made of a nonconducting material to function as said shield.

16. A rotor film apparatus according to claim 12 wherein there is a shield of a nonconducting material arranged between said inducting wire of the heating inductor and said refluxing stage.

17. A rotor film apparatus according to claim 16 wherein said inducting wire of the heating inductor is located outside the apparatus casing and the casing proper is made of a nonconducting material to function as said shield.

18. A rotor film apparatus for processes with participation of liquid and gas comprising: a casing; a vertical shaft mounted rotatably in said casing; several refluxing stages secured on said shaft one above another; at least one trough forming said refluxing stage, curved into a spiral uncoiling from said shaft and having gaps between its loops for the passage of gas, the hollow of said trough being located at the concave side of said spiral and intended to create a liquid film thereon; portions of said trough displacing upward as they gradually depart from said shaft so that said refluxing stage has a bowl-like shape; said refluxing stages secured on said shaft so that the upper edge of the underlying refluxing stage is arranged higher than the lower edge of the overlying refluxing stage; appliances mounted on said casing for delivering liquid to said refluxing stages.

19. A rotor film apparatus according to claim 18 wherein said troughs at the side of the hollow are provided with longitudinal partitions which divide said troughs into several parallel channels.

20. A rotor film apparatus according to claim 18 wherein each of said refluxing stages is formed by a number of said troughs of a different length and ending at different distances from said shaft, said troughs of a different length being arranged around the shaft in a periodically recurring sequence.

21. A rotor film apparatus according to claim 18 wherein said trough is inclined so that its upper side edge is located farther from said shaft than its lower side edge.

22. A rotor film apparatus according to claim 21 wherein said troughs forming refluxing stages are made of a conducting material and there is an inducting wire of a heating inductor, said wire being located opposite at least one side face of of the refluxing stage and insulated electrically from said refluxing stage and said apparatus casing.

23. A rotor film apparatus according to claim 18 comprising circular pockets for receiving the liquid thrown down from the refluxing stages, secured on the inner wall of said casing around said refluxing stages; the upper edge of each of said circular pockets is located higher than the side edge of the initial portion of the trough of the refluxing stage enveloped by said pocket.

24. A rotor film apparatus according to claim 23 comprising central distributing sleeves which are open from underneath and are secured on said refluxing stages coaxially with said shaft; inclined recirculating pipes installed under said refluxing stages; the upper end of each recirculating pipe, communicating with said circular pocket for receiving the liquid from the refluxing stage under which said recirculating pipe is installed; the lower end of each recirculating pipe inserted from underneath into said distributing sleeve of the refluxing stage under which said recirculating pipe is installed.

25. A rotor film apparatus according to claim 18 wherein there are overflow pipes located in the space between said refluxing stages and putting the peripheral ends of the troughs of the overlying refluxing stage in communication with the central part of the underlying refluxing stage.

26. A rotor film apparatus according to claim 18 wherein there are baffle plates connected with the shaft, located in the spaces between said refluxing stages and arranged, essentially, in a radial direction.

27. A rotor film apparatus according to claim 18 wherein said appliances for delivering the liquid to the refluxing stages comprise pipe connections secured to the side wall of said casing, the discharge ends of said pipe connections being located at a larger distance from the axis of the refluxing stage than the minimum distance between the axis of the refluxing stage and its periphery.

28. A rotor film apparatus according to claim 18 wherein said appliances delivering the liquid to the refluxing stages comprise pipe connections located above said refluxing stages, the walls of said pipe connections being provided with a number of discharge holes located at different distances from the axis of the refluxing stages.

* * * * *